(12) United States Patent
Wi

(10) Patent No.: US 9,833,979 B2
(45) Date of Patent: Dec. 5, 2017

(54) SEAL PROVIDED WITH NON-ADHESIVE HOLDING PART ON TOP SURFACE THEREOF AND METHOD FOR MANUFACTURING THE SAME

(71) Applicant: Seman Wi, Gyeonggi-do (KR)

(72) Inventor: Seman Wi, Gyeonggi-do (KR)

(*) Notice: Subject to any disclaimer, the term of this patent is extended or adjusted under 35 U.S.C. 154(b) by 40 days.

(21) Appl. No.: 14/385,203

(22) PCT Filed: Mar. 7, 2013

(86) PCT No.: PCT/KR2013/001854
§ 371 (c)(1),
(2) Date: Sep. 15, 2014

(87) PCT Pub. No.: WO2013/137590
PCT Pub. Date: Sep. 19, 2013

(65) Prior Publication Data
US 2015/0027619 A1  Jan. 29, 2015

(30) Foreign Application Priority Data

Mar. 15, 2012 (KR) .................. 10-2012-0026580
Feb. 28, 2013 (KR) .................. 10-2013-0021895

(51) Int. Cl.
*B32B 5/18* (2006.01)
*B32B 5/20* (2006.01)
(Continued)

(52) U.S. Cl.
CPC ............... *B32B 37/02* (2013.01); *B32B 5/18* (2013.01); *B32B 5/20* (2013.01); *B32B 7/045* (2013.01);
(Continued)

(58) Field of Classification Search
CPC .......... B29C 65/526; B29C 5/20; B32B 5/18; B32B 7/045; B32B 7/06; B32B 7/14;
(Continued)

(56) References Cited

U.S. PATENT DOCUMENTS 4,961,986 A * 10/1990 Galda .................... B65D 51/20
                                                        215/232
5,004,111 A *  4/1991 McCarthy ............. B65D 51/20
                                                        215/232
(Continued)

FOREIGN PATENT DOCUMENTS

CN          1930262        3/2007
CN        101111437        1/2008
(Continued)

OTHER PUBLICATIONS

International Search Report Dated Jun. 3, 2014 From the Korean Intellectual Property Office Re. Application No. PCT/KR2013/001854 and Its Translation Into English.

*Primary Examiner* — Michael Tolin

(57) ABSTRACT

A method for manufacturing a container seal having an integral pull tab comprises providing a surface layer, an elastic layer, a top layer, an aluminum foil intermediate layer, and laminating a sealing adhesive layer of an adhesive thermoplastic resin or viscous agent to the intermediate layer. An adhesive surface and a non-adhesive portion are added to the thermoplastic resin layer, and placed on the aluminum foil to form a container seal laminate. The container seal laminate is cut to conform with an opening of the container to be sealed. The seal has an integral pull tab.

5 Claims, 3 Drawing Sheets

(51) Int. Cl.
- *B32B 7/06* (2006.01)
- *B32B 7/14* (2006.01)
- *B32B 15/08* (2006.01)
- *B32B 27/08* (2006.01)
- *B32B 38/04* (2006.01)
- *B65D 77/20* (2006.01)
- *B32B 37/02* (2006.01)
- *B32B 37/12* (2006.01)
- *B32B 7/04* (2006.01)
- *B32B 38/00* (2006.01)

(52) U.S. Cl.
CPC ............... *B32B 7/06* (2013.01); *B32B 7/14* (2013.01); *B32B 15/08* (2013.01); *B32B 27/08* (2013.01); *B32B 37/1292* (2013.01); *B32B 38/0004* (2013.01); *B32B 38/0032* (2013.01); *B32B 38/04* (2013.01); *B65D 77/204* (2013.01); *B65D 77/2024* (2013.01); *B32B 2038/042* (2013.01); *B32B 2038/047* (2013.01); *B32B 2266/025* (2013.01); *B32B 2305/022* (2013.01); *B32B 2323/00* (2013.01); *B32B 2435/02* (2013.01); *B65D 2577/2058* (2013.01)

(58) Field of Classification Search
CPC ....... B32B 15/08; B32B 15/20; B32B 27/065; B32B 27/08; B32B 37/1292; B32B 38/0004; B32B 2038/042; B32B 2038/047; B32B 2266/025; B32B 2305/022; B32B 2435/02; B65D 77/2024; B65D 2577/2041; B65D 2577/205; B65D 2577/2058

See application file for complete search history.

(56) References Cited

U.S. PATENT DOCUMENTS

| | | |
|---|---|---|
| 2003/0168423 A1 | 9/2003 | Williams |
| 2008/0073308 A1 | 3/2008 | Yousif |
| 2010/0047552 A1* | 2/2010 | McLean ............... B32B 27/08 428/317.1 |
| 2010/0221483 A1* | 9/2010 | Gonzalez Carro ....... B32B 7/14 428/66.4 |

FOREIGN PATENT DOCUMENTS

| | | |
|---|---|---|
| CN | 101580153 | 11/2009 |
| JP | 04-367439 | 12/1992 |
| JP | 08-175562 | 7/1996 |
| KR | 10-0256518 | 5/2000 |
| KR | 10-0711073 | 4/2007 |
| KR | 10-1196147 | 10/2012 |

* cited by examiner

[Fig. 1]
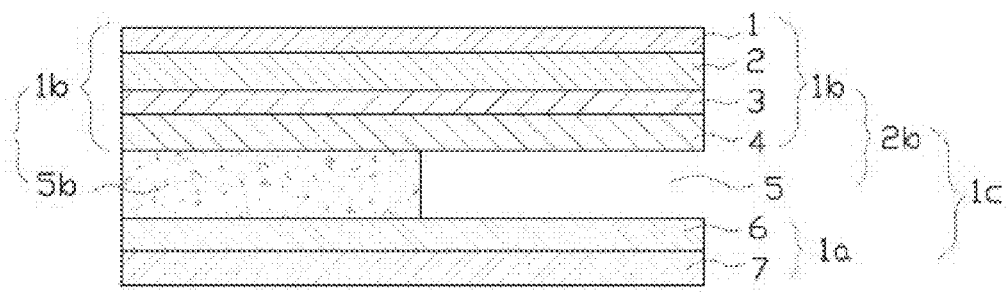
[Fig. 2]
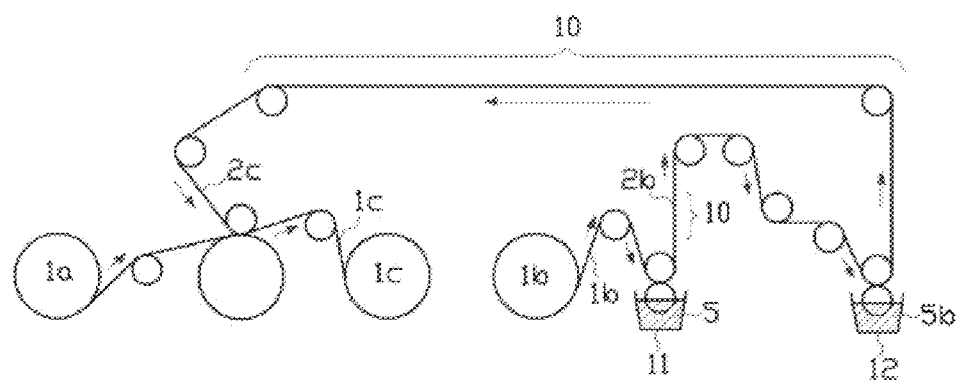
[Fig. 3a]
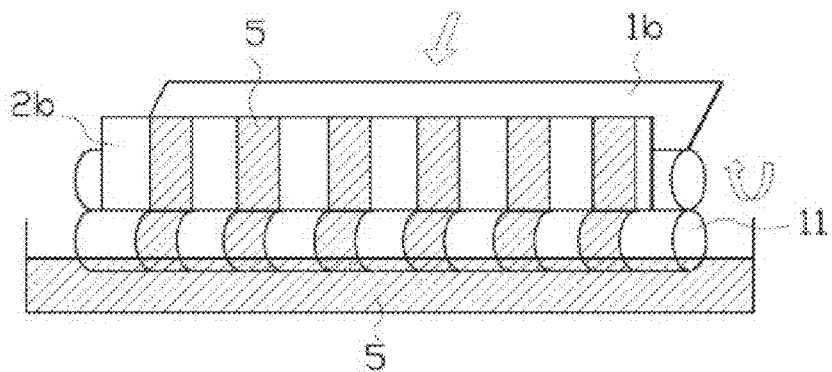

[Fig. 3b]
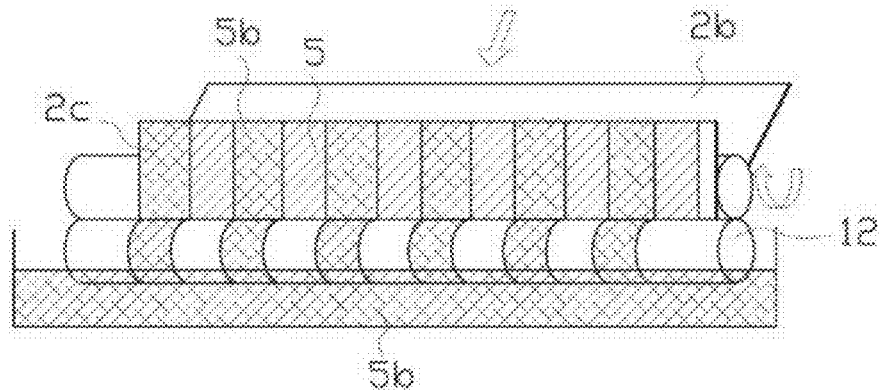
[Fig. 4]
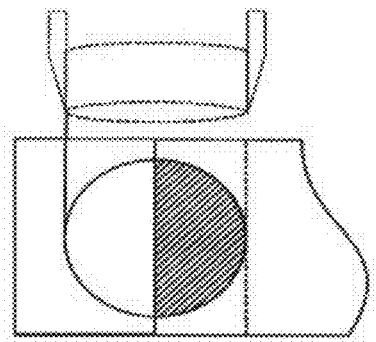
[Fig. 5]
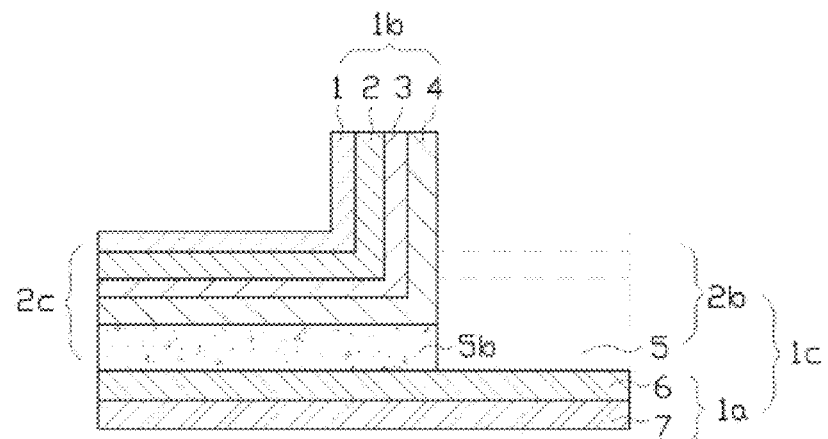

[Fig. 6a]
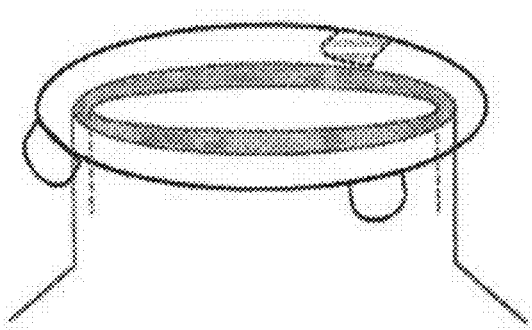
[Fig. 6b]
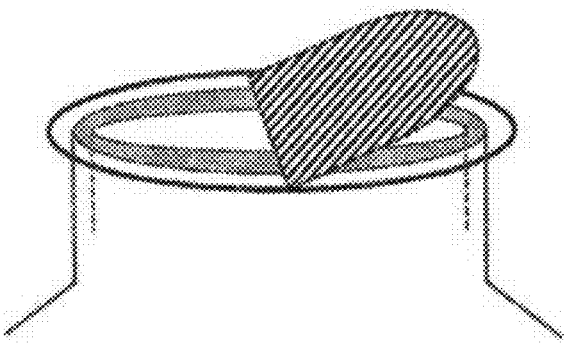

SEAL PROVIDED WITH NON-ADHESIVE HOLDING PART ON TOP SURFACE THEREOF AND METHOD FOR MANUFACTURING THE SAME

RELATED APPLICATIONS

This application is a National Phase of PCT Patent Application No. PCT/KR2013/001854 having International filing date of Mar. 7, 2013, which claims the benefit of priority of Korean Patent Application Nos. 10-2012-0026580 filed on Mar. 15, 2012 and 10-2013-0021895 filed on Feb. 28, 2013. The contents of the above applications are all incorporated by reference as if fully set forth herein in their entirety.

TECHNICAL FIELD

Embodiments relate to a seal provided with a non-adhesive holding part on a portion of the top surface and a method for manufacturing the same, and more particularly to a seal which is easily detached from a container by forming an adhesive surface and a non-adhesive surface (Tap Line), i.e., a holding part on the top thereof for the purpose of easily opening. The seal has better workability in manufacture thereof without defects and prevents curling of a finished product, and a method for manufacturing the seal.

BACKGROUND DESCRIPTION

A product requiring air-tightness like common beverages or medical supplies is packaged in a container and, then for the purpose of ensuring the air-tightness, the entrance of the container is sealed with a seal made of a synthetic resin in the form of a film (hereafter, referred to as a "seal"). The seal seals the entrance of a container which packages the beverage or medical supplies, etc., and is made of various materials like plastic or glass, so that products like liquefied or damp material or dry powder can be prevented from leaking out of the container or from being absorbed by the outside air.

However, since the entrance of the container and the seal are completely adhered to each other, the sealing is effectively done. When the contents of the container are intended to be extracted, the seal is required to be peeled. Here, since there is no gap between the container and the seal, it is difficult to peel the seal. Also, in some cases, the gap is created by means of a hand or a tool such as scissors. Therefore, the hands or tool contacts with the entrance of the container, so that sanitary problems occur.

Therefore, in order to overcome the above-mentioned problems, the conventional technologies have been presented. For one example, as shown in FIG. 6a, proposed was a configuration in which the holding parts are formed at the edge of the seal. However, such a configuration has problems in the manufacturing process and cost, and it is difficult to open the seal due to the small holding part. To overcome this, FIG. 6a shows a small handle is attached to the seal. The structure of FIG. 6b can be shown in the Korean Patent No. 10-0711073 filed and registered by the present inventor. The seal of FIG. 6a has a tap formed on the top surface thereof for easy opening and is easily detached from the container by holding the tap. The Korean Patent No. 10-0711073 discloses a container seal to which the tap has been attached and which includes a surface layer which is located on the top of the seal of the container and is made of a material having no thermal adhesiveness; a thermal adhesive resin layer which is formed by laminating a thermoplastic resin with a suitable thickness on the surface layer; an adhesive layer which is made of a thermoplastic resin or adhesive agent and is adhered under the thermal adhesive resin layer; an intermediate base layer which is adhered to the adhesive layer and is made of aluminum foil or plastic film; and a sealing adhesive layer which is adhered under the intermediate base layer and is adhered to the container made of an adhesive thermoplastic resin or viscous agent. The publication of Korean Patent Application No. 2010-0040286 discloses a seal for food stuff container. The seal is formed by laminating through the coextensive inclusion of a) a plastic top layer; b) a plastic/foaming agent adhesive layer; c) a foam layer; d) a foaming agent/foil adhesive layer; e) metal foil; and f) a thermo-sealing layer. The plastic/foaming agent adhesive agent causes the foaming agent to adhere to the plastic top layer with respect to at least a portion of the opposite side between them. The foaming agent/foil adhesive layer causes the foaming agent to adhere to the foil over the substantially entire area of the opposite side between them by an adhesive strength of at least 8N/12.5 mm measured by a 180° peel test to be described in the detailed description of the invention. When measured by the density measurement method described herein, the measured density has a value within a range between 0.6 and 0.95 ml$^{-1}$.

However, the seal according to the presented methods still has a complex manufacturing process, a high manufacturing cost, and a high error rate due to the inconvenient work. Therefore, there is a requirement for the improvement of this. In order to satisfy the requirement, the Korean Patent No. 10-1196147 filed by the applicant discloses a seal which has an adhesive surface and a non-adhesive holding part formed on the top thereof for the purpose of easily opening, so that the seal is easily detached from a container by holding the holding part. The seal includes a surface layer which is located on the top of the seal of the container and is made of a material having no thermal adhesiveness; a top layer which is formed by laminating a plastic film with a suitable thickness on the surface layer; an intermediate layer which is formed by laminating the plastic film or polyolefin foaming agent on the aluminum foil; and a sealing adhesive layer which is adhered under the intermediate layer and is adhered to the container made of the adhesive thermoplastic resin or viscous agent. The holding part is formed on the bottom surface of the top layer made of the plastic film and on the aluminum foil layer of the top surface of the intermediate layer formed by laminating the plastic film or polyolefin foaming agent on the aluminum foil.

However, when the container is sealed with the seal configured as described above, the forming agent located in the intermediate layer causes the increase of a high frequency, poor sealing, and curling of a finished product of the seal. As a result, it becomes difficult to perform the sealing process.

PRIOR DOCUMENTS

Patent Document

Document 1: Korean Patent No. 10-0711073
Document 1: Korean Patent Application No. 2010-0040286
Document 1: Korean Patent No. 10-1196147

DETAILED DESCRIPTION

Technical Assignment

Accordingly, the embodiment of the present invention is proposed in consideration of the above-described conventional technologies. The main objective of the embodiment of the present invention is to provide a method for easily manufacturing a seal which is easily detached from a container by forming an adhesive surface and a non-adhesive surface (Tap Line), i.e., a holding part on the top thereof for the purpose of easily opening.

Another objective of the embodiment of the present invention is to provide a seal which has the adhesive surface and the non-adhesive surface (Tap Line), i.e., the holding part on the top thereof for the purpose of easily opening, so that the seal is easily detached from the container by holding the holding part.

Further another objective of the embodiment of the present invention is to provide a seal which is easily opened, is manufactured by more excellent workability without poor sealing and prevents curling of a finished product.

Yet another objective of the embodiment of the present invention is to achieve not only the above-described clear objectives but other objectives which can be easily derived from the overall technology of the present specification by those skilled in the art.

Technical Solution

For achieving the above objectives, a seal is provided which has the non-adhesive holding part on a portion of the top surface thereof.

The seal has the adhesive surface and the non-adhesive holding part (Tap Line) on the top thereof for the purpose of easily opening, so that the seal is easily detached from the container by holding the holding part. The seal includes: a top layer including:
a surface layer comprised of a surface layer which is located on the top of the seal of the container and is made of a material having no thermal adhesiveness;
an elastic layer which is located under the surface layer and has a suitable thickness;
a plastic film layer which is laminated under the elastic layer; and
a thermoplastic resin layer laminated under the film layer;
an intermediate layer comprised of an aluminum foil layer located under the top layer; and
a sealing adhesive layer which is adhered under the intermediate layer and is adhered to the container made of the adhesive thermoplastic resin or viscous agent.

The holding part is formed by forming a non-adhering part as well as an adhering part on the bottom surface of the top layer made of the thermoplastic resin and the top surface of the intermediate layer made of the aluminum foil.

According to another configuration of the present invention, the elastic layer is formed by laminating the thermoplastic resin or a polyolefin foaming agent.

According to another configuration of the present invention, the adhesive layer is formed by an adhesive agent of a mixture of solvent-based two component polyurethane.

According to another configuration of the present invention, the solids of the adhesive agent forming the adhesive layer is from 60 to 70%, and the viscosity of the adhesive agent is from 2,500 to 3,500 (25° C., mPa·s).

According to another configuration of the present invention, the coating amount of the adhesive agent is 4 to 6 g/m² so as to have a predetermined adhesive strength, and the area of the adhesive surface is 10 to 80 mm.

According to another configuration of the present invention, the thickness of the intermediate layer of aluminum foil is within a range between 12 μm and 50 μm.

A method for manufacturing the seal which has the non-adhesive holding part on a portion of the top surface thereof according to the embodiment of the present invention for achieving another objective thereof is provided.

A method for manufacturing the seal for forming the holding part (Tap Line) includes:
a first step of laminating with a suitable thickness by foaming the thermoplastic resin or polyolefin foaming agent on the surface layer made of the material having no thermal adhesiveness;
a second step of forming the top layer by sequentially laminating the plastic film layer and thermoplastic resin layer under the elastic layer;
a third step of preparing the intermediate layer made of the aluminum foil;
a fourth step of laminating the sealing adhesive layer which is made of the adhesive thermoplastic resin or viscous agent, is located under the intermediate layer and is adhered to the container;
a fifth step of forming the adhesive surface and the non-adhesive holding part (Tap Line) on the surface comprised of the thermoplastic resin under the top layer formed in the second step and on the top surface of the aluminum foil of the intermediate layer on which the sealing adhesive layer has been laminated under the aluminum foil in the third step; and
a sixth step of cutting or perforating the holding part in conformity with the entrance size of the container after the integral formation in the fifth step.

According to another configuration of the present invention, the forming the holding part (Tap Line) in the fifth step is performed by using two rolls in which grooves have been formed at a regular interval. A release coating agent is applied on a portion to become the holding part (Tap Line) in the first roll. Subsequently, the adhesive agent is applied on a remaining portion other than the holding part in the second roll.

According to another configuration of the present invention, the sixth step is performed according to a cutting method thereof in the forms in which the holding part (Tap Line) is located on the top middle of a sealing sheet of the seal and on the top end of the sealing sheet of the seal.

According to another configuration of the present invention, a laminating speed of forming the adhesive surface and the non-adhesive holding part (Tap Line) of the fifth step is 50 to 70 m/min. If the laminating speed is greater than 70 m/min, the adhesive agent is little applied and spread. If the laminating speed is less than 50 m/min, the operation speed is reduced and the adhesive agent is excessively applied and spread, so that the adhesive strength is decreased.

According to another configuration of the present invention, in applying the release coating agent, the piece of the copperplate is from 200 to 250.

According to another configuration of the present invention, in forming the non-adhesive holding part (Tap Line), the coating amount of the release coating agent is 3 to 4 g/m², thereby preventing the adhesion due to heat between the top layer and the aluminum foil layer when a high frequency induction heating is used.

According to another configuration of the present invention, the plastic film layer prevents the holding part of the top layer from being curved when the holding part is perforated or cut.

According to another configuration of the present invention, the plastic film layer is desirably made of polyethylene terephthalate (PET).

Advantageous Effects

According to the seal which is formed as described above and is provided with the non-adhesive holding part on a portion of the top surface and the method for manufacturing the seal, the adhesive surface and the non-adhesive holding part are more easily formed on the top of the seal, so that the seal is more easily peeled and the contents in the container is more simply pulled out. Also, the entrance of the container does not come in contact with hands, so that the entrance of the container is not covered with impurities and sanitary problems are prevented. Further, since the seal having a specific layer structure is provided, the seal can be manufactured better workability without defects. The seal also has an excellent effect capable of preventing curling of a finished product.

DESCRIPTION OF DRAWINGS

FIG. 1 is a cross sectional view of a seal having a holding part (Tap Line) according to an embodiment of the present invention;

FIG. 2 is a process flow chart schematically showing a manufacturing process of the seal according to the embodiment of the present invention;

FIGS. 3a-3b are partial perspective views showing a device used in a coating process for forming the holding part according to the embodiment of the present invention;

FIG. 4 is a view showing schematically that the seal manufactured according to the embodiment of the present invention is cut depending on an applicable size;

FIG. 5 is a cross sectional view showing that the holding part (Tap Line) manufactured according to the embodiment of the present invention has been erected; and FIGS. 6a-6b are views showing an example of a conventional seal attached to an entrance of a container.

BEST MODE

Hereafter, the embodiment of the present invention will be described in more detail with reference to the accompanying drawings. Before the detailed description, it should be noted that the terms and words used in the detailed description and the claims are not to be limited to their conventional and lexical meanings, but are to be interpreted to conform with the technical idea of the present invention under the principle that the inventor can properly define the terms for the best description of the invention made by the inventor.

FIG. 1 is a cross sectional view of a seal having a holding part (Tap Line) according to an embodiment of the present invention. FIG. 2 is a process flow chart schematically showing a manufacturing process of the seal according to the embodiment of the present invention. FIGS. 3a-3b are partial perspective views showing a device used in a coating process for forming the holding part according to the embodiment of the present invention.

As shown in the drawings, provided is a seal 1c provided with the non-adhesive holding part on a portion of the top surface thereof. The seal, which has the adhesive surface and the non-adhesive holding part (Tap Line) on the top thereof for the purpose of easily opening, so that the seal is easily detached from the container by holding the holding part, includes: a surface layer 1 comprised of a surface layer which is located on the top of the seal of the container and is made of a material having no thermal adhesiveness; an elastic layer 2 which is located under the surface layer and has a suitable thickness; a plastic film layer 3 which is laminated under the elastic layer 2; and a top layer 1b comprised of a thermoplastic resin layer 4 laminated under the film layer 3; an intermediate layer 6 comprised of an aluminum foil layer located under the top layer; and a sealing adhesive layer 7 which is adhered under the intermediate layer 6 and is adhered to the container made of the adhesive thermoplastic resin or viscous agent. A non-adhering part 5 as well as an adhering part 5b is formed on the bottom surface of the top layer made of the thermoplastic resin and the top surface of the intermediate layer made of the aluminum foil, so that a portion of the top layer 1b, which does not adhere to the intermediate layer, becomes the holding part. The elastic layer may be formed by laminating the thermoplastic resin or a polyolefin foaming agent.

In the seal according to the embodiment of the present invention, the thermoplastic resin or polyolefin foaming agent is laminated between the surface layer 1 and the plastic film layer 3, so that the intermediate layer 2 is formed. Therefore, the seal is manufactured by more excellent workability and it is possible to completely overcome the poor sealing between the seal and the container. Also, the specific layer structure of the seal is provided according to the embodiment of the present invention, thereby preventing curling of the finished product of the seal.

MODE FOR INVENTION

According to the embodiment of the present invention, the adhering part 5b is not particularly limited and may be desirably formed by an adhesive agent of a mixture of solvent-based two component polyurethane. Also, the solids of the adhesive agent forming the adhesive layer may be desirably from 60 to 70%, and the viscosity of the adhesive agent may be desirably from 2,500 to 3,500 (25° C., mPa·s). The adhesive agent out of these ranges has a very high or a very low adhesive strength, and thus, the easy peeling by the holding part according to the embodiment of the present invention is undesirably hindered.

Moreover, for the purpose of the easy peeling by the holding part formed according to the configuration of the embodiment of the present invention, it is desirable that the coating amount of the adhesive agent is 4 to 6 g/m$^2$ and the area of the adhesive surface is 10 to 80 mm.

According to the embodiment of the present invention, the thickness of the intermediate layer 6 of aluminum foil is within a range between 12 μm and 50 μm. If the thickness is less than 12 μm, the strength of the seal is weak and undesirable, and if the thickness is larger than 50 μm, the manufacturing cost increases and the workability is deteriorated. In particular, from the viewpoint of provision of an appropriate strength and prevention of the curling, it is desirable that the thickness is limited to the range.

FIG. 4 is a view showing schematically that the seal manufactured according to the embodiment of the present invention is cut depending on an applicable size. FIG. 5 is a cross sectional view showing that the holding part (Tap Line) manufactured according to the embodiment of the present invention has been erected.

As shown in the drawings, so as to seal the container, the seal is cut to an appropriate size in conformity with the entrance of the container, and then the container is sealed. For the purpose of easily detaching the seal at the entrance of the sealed container, as shown in FIG. 5, a portion (1b of FIG. 5) of the top layer, on which the adhesive surface and the non-adhesive holding part are formed, is formed on an appropriate position of the top of the seal. Then, it is possible to easily peel the sealing surface of the seal from the sealing surface of the entrance of the container by holding and pulling the holding part 1b.

The portion constituting the seal includes, as shown in FIG. 1, a formative layer 5b and 5 which forms the adhering part 5b and the holding part (Tap Line) of the non-adhering part 5 between the bottom surface of the top layer 1b and the aluminum foil layer of the intermediate layer 6, and includes the sealing adhesive layer 7 which actually adheres to the entrance of the container.

A method for manufacturing the structure of the seal configured as described above according to the embodiment of the present invention will be described in detail.

The method for manufacturing the holding part of the seal includes, as shown in FIG. 1: a first step of laminating with a suitable thickness by foaming the thermoplastic resin or polyolefin foaming agent on the surface layer 1 made of the material having no thermal adhesiveness; a second step of forming the top layer 1b by sequentially laminating the plastic film layer 3 and thermoplastic resin layer 4 under the elastic layer 2; a third step of preparing the intermediate layer 6 made of the aluminum foil; a fourth step of laminating the sealing adhesive layer 7 which is made of the adhesive thermoplastic resin or viscous agent, is located under the intermediate layer 6 and is adhered to the container; a fifth step of forming the holding part (Tap Line) by the adhering part 5b and the non-adhering part 5 on the surface comprised of the thermoplastic resin under the top layer 1b formed in the second step and on the top surface of the aluminum foil of the intermediate layer 6 on which the sealing adhesive layer has been laminated under the aluminum foil in the third step; and a sixth step of cutting or perforating the holding part in conformity with the entrance size of the container after the holding part is integrally formed in the fifth step. Here, the surface where the non-adhering part 5 is formed is release-coated, and when a high frequency induction heating is used, adhesion due to heat between the non-adhering part 5 and the intermediate layer 6 made of the aluminum foil is prevented. The sealing adhesive layer 7 is laminated under the intermediate layer 6, so that a sealing layer 1a is formed.

Next, referring to FIGS. 2 and 3, the surface layer having no thermal adhesiveness, the elastic layer comprised of the laminated thermoplastic resin or polyolefin foaming agent, and the top layer 1b comprised of the plastic film layer and thermoplastic resin layer are, as shown in FIG. 3a, release-coated 5 by using a roller which has grooves forming surfaces to be coated and surfaces not to be coated. The release-coated top layer 2b passes through a chamber 10 and is coated with the adhesive agent by using roller having the adhering part 5b and the non-adhering part 5 of FIG. 3b. The coated fabric 2c is dried while passing through the chamber 10. The dried fabric 2c is laminated with the sealing layer 1a by using a press roll. During the laminating process, the fabric is divided into the non-adhering part 5 and the laminated adhering part 5b, so that the holding part (Tap Line) is formed.

Also, although the sealing layer 1a which adheres to the container is represented as the sealing adhesive layer 7 which actually adheres to the container in accordance with the structure of FIG. 5 and is made of the adhesive thermoplastic resin or viscous agent, and the intermediate layer 6 made of the aluminum foil, a layer made of a specific material may be added between the layers or the intermediate layer 6 for the sake of the strength increase and barrier increase of the seal, or a specific property of the contents, for example, increase of resistance to strong acid, etc. Particularly, the layer to be added may be located at other positions without being limited to the mentioned positions in order to maintain the rigidity after being cut.

According to the embodiment of the present invention, it is desirable that the laminating speed of the adhering part and the non-adhesive holding part (Tap Line) is 50 to 70 m/min. If the laminating speed is greater than 70 m/min, the adhesive agent is little applied and spread. If the laminating speed is less than 50 m/min, the operation speed is reduced and the adhesive agent is excessively applied and spread, so that the adhesive strength is decreased.

According to the embodiment of the present invention, in forming the non-adhesive holding part (Tap Line), it is desirable that the piece of the release coating agent copper-plate is from 200 to 250 and the coating amount of the release coating agent is 3 to 4 $g/m^2$, thereby preventing the adhesion due to heat between the top layer and the aluminum foil layer when a high frequency induction heating is used.

After integral formation by the described process, the container seal having the holding part formed thereon according to the embodiment of the present invention is manufactured by cutting or perforating, as shown in FIG. 4, the holding part in conformity with the entrance size of the container. Here, it is desirable that the container seal is manufactured according to a cutting method thereof in the forms in which the holding part is located on the top middle of a sealing sheet of the seal and on the top end of the sealing sheet of the seal.

INDUSTRIAL APPLICABILITY

The container seal having the holding part formed thereon and the method for manufacturing the same have been described in the detailed description of the present invention. The contents thereof are not limited to the technical field of the present invention disclosed in the following claims. It will be understood by those skilled in the art to which the present invention belongs that various changes in forms and details may be made therein without departing from the spirit and scope of the present invention as defined by the appended claims.

[Reference numerals]

| | |
|---|---|
| 1: surface layer | 2: elastic layer |
| 3: plastic film layer | 4: thermoplastic resin layer |
| 5: non-adhering part | 5b: adhering part |
| 6: intermediate layer | 7: sealing adhesive layer |
| 1a: sealing layer | |
| 1b: top layer | |
| 1c: seal | |

The invention claimed is:
1. A method for manufacturing a container seal having an integral pull tab, the method comprising:
   a first step of providing a surface layer of a material having no thermal adhesiveness;

a second step of forming an elastic layer under the surface layer by applying a thermoplastic resin to said surface layer;

a third step of forming a top layer by laminating a plastic film layer under the elastic layer and laminating thermoplastic resin under the plastic film layer;

a fourth step of providing an aluminum foil intermediate layer;

a fifth step of laminating a sealing adhesive layer which is made of an adhesive thermoplastic resin or viscous agent to the aluminum foil intermediate layer;

a sixth step of forming an adhesive surface and a non-adhesive portion on an exposed surface of the thermoplastic resin layer, and then placing the adhesive surface and the non-adhesive portion on a top surface of the aluminum foil of the intermediate layer on which a sealing adhesive layer has been laminated in the fifth step, to form a container seal laminate; and a seventh step of cutting or perforating the container seal laminate to a size which conforms with a diameter of an opening of a container to form a seal for the container, the seal having an integral pull tab, wherein the step of forming of the adhesive surface and the non-adhesive portion in the sixth step is performed by providing first and second rolls in which grooves have been formed at a regular interval, using said first roll to apply a release coating agent on the exposed surface of the thermoplastic resin layer corresponding to the non-adhesive portion to become the pull tab part and subsequently using the second roll to apply an adhesive agent to a remaining portion of the exposed surface of the thermoplastic resin layer corresponding to the adhesive surface.

2. The method of claim 1, wherein the cutting or perforating of the seventh step is performed such that the integral pull tab is located on a top surface of the container seal opposite a bottom surface defined by the sealing adhesive layer.

3. The method of claim 1, comprising moving the top layer at a speed of 50 to 70 m/min during said sixth step of forming said adhesive surface and said non-adhesive portion on the surface of the thermoplastic resin layer.

4. The method of claim 1, wherein the release coating agent is applied in an amount of 3 to 4 $g/m^2$.

5. The method of claim 1, wherein the plastic film layer is made of polyethylene terephthalate (PET).

* * * * *